UNITED STATES PATENT OFFICE.

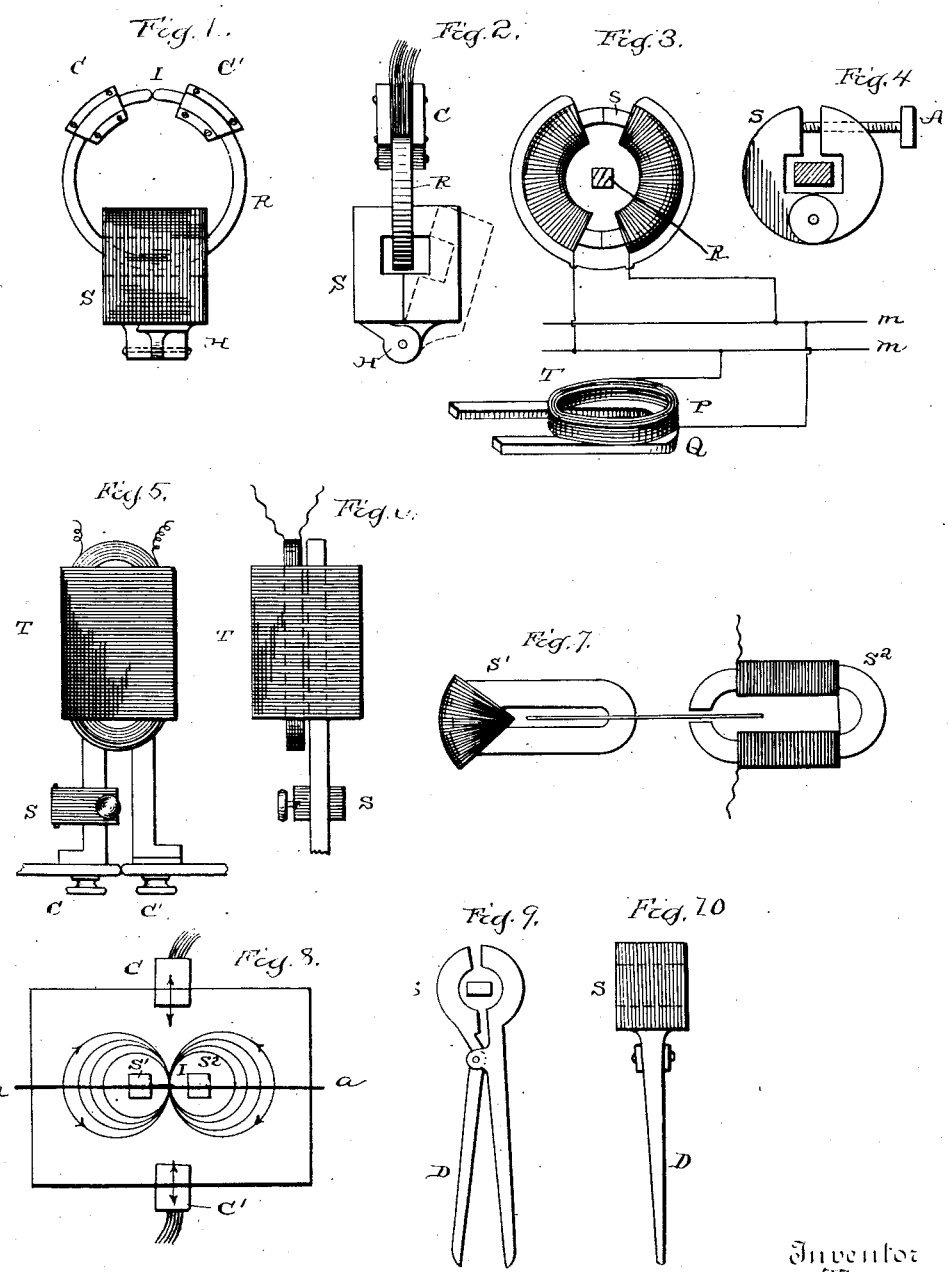

ELIHU THOMSON, OF LYNN, MASSACHUSETTS.

METHOD OF ELECTRIC WELDING AND SHAPING OF METALS.

SPECIFICATION forming part of Letters Patent No. 403,157, dated May 14, 1889.

Application filed October 15, 1888. Serial No. 288,163. (No model.)

*To all whom it may concern:*

Be it known that I, ELIHU THOMSON, a citizen of the United States, and a resident of Lynn, in the county of Essex and State of Massachusetts, have invented certain new and useful Improvements in Electric Welding and Shaping of Metals, of which the following is a specification.

My invention relates to those metal-working operations—such as welding, forging or shaping, soldering or brazing—in which the heat produced by an electric current resisted in its passage through the work is employed as the means for heating the work. An example of such an operation is that forming the subject of my prior patent, No. 347,140.

In the various operations comprised under the general subject above mentioned it frequently happens that the nature or form of the work or object under manipulation is such that a path for the current is furnished independently of the path which the current should take in order to heat the work at the point or points desired. In other classes of work the path or paths which the current may take through the part of the work which is to be heated is of so great extent or area that the heating-current becomes dissipated or dispersed, and it is impossible to satisfactorily carry on the work without using a current of immense volume.

The object of my invention is to direct, confine, or concentrate the heating-current in the particular path or paths desired or necessary in performing the operation of welding, shaping, brazing, &c.; and to this end my invention consists in setting up or establishing a counter electro-motive force or counter electro-motive force tendency in those parts of the work which form a shunt to the part or parts to be operated upon or in which it is desirable or necessary to check the flow of current in order to use the current in the best or most economical manner, thereby concentrating or confining the current to particular paths, and in some cases, where a positive counter electro-motive force is produced, even assisting the original or prime heating-current.

I have in this specification, for the sake of illustration, more particularly described the manner of practicing my invention in connection with the operation of electric welding or soldering. Its application to other classes of work will be readily understood from the example given, the details of the application varying under particular circumstances.

My invention is especially applicable to the case of ring or cylinder welding or soldering, as will be presently described.

Any devices or means for setting up the counter electro-motive force or electro-motive force tendency will obviously answer the purpose of my invention when applied at the proper point or points of the work.

The special devices which are hereinafter described are especially convenient in ring, cylinder, or plate welding, but are not herein claimed, my present invention being for a method in which said devices may be used or not, as desired.

In carrying out my invention alternating currents of a comparatively high number of alternations per second—as one hundred, less or more—are employed.

In the accompanying drawings, Figures 1 and 2 illustrate the application of my invention to ring-welding, the apparatus being shown in such figures in side and edge view separately. Fig. 3 illustrates a modification in the manner of carrying out my invention. Fig. 4 is a side view of a device convenient for modifying the counter electro-motive force tendency in the ring or conductor which is a shunt to the heating-path. Figs. 5 and 6 show applications of the device shown in Fig. 4. Figs. 7 and 8 illustrate the application of my invention to plate-welding, Fig. 7 showing the plate and applied devices in edge view, and Fig. 8 in plan. Figs. 9 and 10 show in side and edge view a tool or device that may conveniently be used in the practice of the invention after the manner illustrated in Fig. 1.

In Figs. 1 and 2, C C' are clamps and conductors as ordinarily used to pass alternating currents to a bent bar, R, to be made into a ring or to be heated at any spot for welding or other working, as at I, between the clamps. Now in such case a considerable fraction of the current used will, in the absence of any special provision, pass around the piece or ring R from one clamp to the other through the continuous portion thereof, avoiding the part I. In very heavy and small diameter rings or links the current so shunting will be a large fraction, and may result in lessened economy of heat or work in welding or shaping the part directly between the clamps C C'. By my invention, however, most of the current tending to so pass around is effectually shut off, such result being secured by setting up in the ring at the part liable to be traversed by shunted current a counter electro-motive force or electro-motive force tendency opposing the passage of such currents. A convenient means of establishing such counter electro-motive force tendency or opposition is an iron sheath, S, partially or entirely surrounding that part of the piece R below the clamp C C'. This sheath is preferably made of laminated iron or of iron wire and divided into two parts, so that it may be put on or taken off by separating the parts. The parts may be hinged together, as at II. The iron sheath S gives a magnetic circuit around the piece R, which sets up a strong counter electro-motive force to the currents which attempt to thread themselves through the sheath in rapidly alternating directions. The practical effect is to virtually convert the lower part of the bar or piece R into a non-conductor of alternating currents. Instead of one such sheath S, several smaller may of course be provided.

As shown in Fig. 3, the sheath S may have its portions wound with insulated wire and connected to the source of alternating currents—such as the mains $m\,m$, which supply current to a transformer, whose primary coil P, or the currents therein, induce welding or heavy currents in a secondary bar, Q, for supplying the current to the work. If the currents in Q are sent through the piece R by the clamps C C', and the sheath S, Fig. 3, so wound and connected be applied, the direction of currents may be such that the winding on the sheath actually develops counter-currents in the part of the ring R, Fig. 1, passing through it, which current will be in proper direction not only to prevent the working-current supplied to the clamps from being shunted, but also to assist the welding-currents in developing heat at the joint I by adding themselves thereto, the ring R itself becoming a secondary coil, as it were.

In Fig. 4 a means for adjusting the magnetic conductivity of the sheath is shown, being a screw, A, separating the two parts more or less. This varies the counter electro-motive force which may be developed by the application of the sheath. In fact, the sheath so constructed may be applied to surround any circuit or portion of a circuit, conveying alternating impulses for modifying them directly by generation of counter electro-motive force.

In Figs. 5 and 6 a welding induction-coil, T, has the secondary bar or circuit thereof extended, and around it and between the coil T and the welding-clamps C C' the sheath S, of adjustable character, may be applied to vary the counter electro-motive force set up in the secondary circuit, or its self-induction, and so to modify the strengths of current delivered by it to the work.

My invention is likewise applicable to localizing the passage of current in metal masses of some width, as when two plates are abutted endwise or edgewise and there is not power of current enough to heat the whole joint at one time. In this case the aim is to so localize the current that its passage may be effected through any part of the joint to heat the same, even though the other parts possess high conduction and much larger extent, and are also at the same time in electrical connection with the clamps or other devices.

In Fig. 7, $S'$ and $S^2$, the sheaths or conductors of magnetism are wound with copper wire and utilized, as was the sheath S in Fig. 3, not only to set up the counter electro-motive force opposing the current, which tends to avoid the part of the work selected for welding, but to actually add to or enhance the flow of current taking place at the point I, Fig. 8, of the line of union $a\,a$ to be formed, by setting up between their limbs counter-currents, which return, as in Fig. 8, along with the main currents from the main source and clamps by the path I. This is done by connecting the coils on $S'$ and $S^2$, as in Fig. 3, with the source-of-energy current supplying the main welding-currents, as $m\,m$, Fig. 3.

Fig. 8 shows the courses taken by the currents in Fig. 7, a crowding taking place at I, composed of the main transverse-current flow and the current-eddies set up inductively between the limbs or poles of $S'$ and $S^2$. The heat being as the squares of the current, it will be seen that most of the heating effect is given out at I for any desired purpose, and a true localization of the heating effects of the currents takes place thereat.

I sometimes construct the magnetic sheath as a part of a sort of tongs, as in Figs. 9 and 10, with handles D for separating and approaching the parts of the sheath proper, S, jointed as shown. A means for quick application of the sheath to inclose a conductor or bundle of conductors is thus provided for cases in which it is desired to produce and vary the counter electro-motive force in the conductor.

What I claim as my invention is—

1. The herein-described improvement in electric metal-working, consisting in setting up or establishing a counter electro-motive force or tendency in those parts of the work which form a shunt to the part to be heated, for the purpose of confining or localizing the heating-current at the part to be operated upon.

2. The herein-described improvement in electrical ring-welding, &c., consisting in establishing in the continuous portion of the blank a counter electro-motive force or tendency opposing the flow of current there-through from one to the other of the clamps by which the heating-current is supplied.

3. The herein-described improvement in electric metal-working by alternating currents, which consists in establishing in the part of the work forming a shunt to the portion to be heated a series of alternating currents derived from the same source as the main heating-currents, and tending to oppose the main heating-current in the shunt, while at the same time assisting such main currents in heating the work.

Signed at Lynn, in the county of Essex and State of Massachusetts, this 11th day of October, A. D. 1888.

ELIHU THOMSON.

Witnesses:
J. W. GIBBONEY,
O. K. STUART.